United States Patent
Mahrenholtz et al.

(10) Patent No.: US 12,104,627 B2
(45) Date of Patent: Oct. 1, 2024

(54) TOGGLE FASTENER AND METHOD OF USE

(71) Applicant: BLACK & DECKER INC., New Britain, CT (US)

(72) Inventors: Philipp Mahrenholtz, Idstein (DE); Didier Villatte, Idstein (DE)

(73) Assignee: BLACK & DECKER INC., New Britain, CT (US)

( * ) Notice: Subject to any disclaimer, the term of this patent is extended or adjusted under 35 U.S.C. 154(b) by 180 days.

(21) Appl. No.: 17/816,221

(22) Filed: Jul. 29, 2022

(65) Prior Publication Data
US 2022/0364587 A1    Nov. 17, 2022

Related U.S. Application Data

(63) Continuation of application No. PCT/US2020/064018, filed on Dec. 9, 2020.

(51) Int. Cl.
| | |
|---|---|
| *F16B 21/00* | (2006.01) |
| *F16B 2/08* | (2006.01) |
| *F16B 13/08* | (2006.01) |

(52) U.S. Cl.
CPC ............ *F16B 13/0808* (2013.01); *F16B 2/08* (2013.01)

(58) Field of Classification Search
CPC .. B65D 63/1063; F16B 13/0808; F16B 13/08; F16B 13/045; F16B 13/04; F16B 13/02
USPC .................................................. 411/345, 346
See application file for complete search history.

(56) References Cited

U.S. PATENT DOCUMENTS

| | | | | |
|---|---|---|---|---|
| 4,043,245 A * | 8/1977 | Kaplan | ............... | F16B 13/0808 411/969 |
| 4,439,079 A * | 3/1984 | Losada | ............... | F16B 13/0808 411/340 |
| 4,573,844 A * | 3/1986 | Smith | ................... | F16B 21/073 24/453 |
| 8,858,143 B2 * | 10/2014 | Gaudron | ............. | F16B 13/0808 411/344 |
| 2019/0107136 A1 * | 4/2019 | Daly | .................. | F16B 13/0808 |
| 2019/0331147 A1 | 10/2019 | McDuff | | |

FOREIGN PATENT DOCUMENTS

EP            0837254 A1    4/1998

OTHER PUBLICATIONS

International Search Report Dated Mar. 19, 2021 cited in corresponding PCT Application No. PCT/US2020/064018.

* cited by examiner

*Primary Examiner* — Gary W Estremsky
(74) *Attorney, Agent, or Firm* — Kofi A. Schulterbrandt

(57) ABSTRACT

A toggle fastener includes an arm extending along a first axis and defining a threaded opening through the arm along a direction perpendicular to the first axis the toggle fastener. A rachet strap extends along a second axis and is pivotally coupled to the arm adjacent a proximal end of the rachet strap. The arm and rachet strap cooperate to block the arm and rachet strap from aligning. Pivoting the arm and the rachet strap relative to each other about a first direction, the angle between the first and second axes can be reduced to a first angle before further pivoting is blocked in a first blocking configuration of the toggle fastener. Attempting to pivot the rachet strap further in the first direction relative to the arm causes the rachet strap to recoverably flex.

11 Claims, 4 Drawing Sheets

TOGGLE FASTENER AND METHOD OF USE

CROSS-REFERENCE TO RELATED APPLICATIONS

This application is a continuation of PCT Application No. PCT/US2020/064018, filed Dec. 9, 2020 which claims priority from GB Patent Application No. 2001604.4, filed Feb. 6, 2020 the disclosures of which is incorporated herein by reference in its entirety.

FIELD OF THE INVENTION

This specification concerns toggle fasteners.

BACKGROUND OF THE INVENTION

Toggle fasteners are known such as described in EP0837254A1 which has a cross bar that pivots under gravity between a first, inline, position relative to a strap and a second, perpendicular, position relative to the strap. In order to use, it is necessary to know the orientation of the fastener, which can be difficult to know when the cross bar has been inserted into a hole and is thus no longer visible. It would be desirable to have a toggle fastener that is quicker and more efficient to install.

BRIEF SUMMARY OF THE INVENTION

According to an aspect of the present invention there is provided a toggle fastener comprising an arm extending along a first axis and defining a threaded opening through the arm along a direction perpendicular to the first axis the toggle fastener further comprising a rachet strap extending along a second axis and pivotally coupled to the arm adjacent a proximal end of the rachet strap the arm and the rachet strap being configured to cooperate for blocking the arm and the rachet strap from aligning upon being rotated relative to each other, wherein upon pivoting the arm and the rachet strap relative to each other about a first direction the angle between the first and second axes can be reduced to a first angle before further pivoting is blocked in a first blocking configuration of the toggle fastener, whereby attempting to pivot the rachet strap further in the first direction relative to the arm causes the rachet strap to recoverably flex, whereas upon pivoting the arm and the rachet strap relative to each other about a second, opposite, direction the angle between the first and second axes can be reduced to a second, smaller, angle before further pivoting is blocked in a second blocking configuration of the toggle fastener, whereby attempting to pivot the rachet strap further in the second direction relative to the arm causes the rachet strap to recoverably flex, the arm and the rachet strap not being formed integrally to each other.

In the first blocking configuration a first abutment portion of the rachet strap on a first side of the rachet strap may engage a planar surface of the arm whereas in the second blocking configuration a second abutment portion of the rachet strap on a second side of the rachet strap may engage the planar surface of the arm, the first abutment portion being located closer to the proximal end along the length of the rachet strap than the second abutment portion.

In the first blocking configuration a first abutment portion of the rachet strap on a first side of the rachet strap may engage a planar surface of the arm whereas in the second blocking configuration a second abutment portion of the rachet strap on a second side of the rachet strap may engage the planar surface of the arm, the first and second abutment portions being located on opposite sides of the pivot point along the length of the rachet strap.

The first abutment portion may be defined by a first edge on a first side of the rachet strap and the second abutment portion may be defined by a second edge on a second side of the rachet strap.

The first abutment portion may comprise two sections respectively on opposing fingers of the rachet strap and the second abutment portion may also comprise two sections respectively on said fingers.

The first angle may be between 60 to 90 degrees, optionally 65 degrees.

The second angle may be between 7 degrees to 20 degrees, optionally 18 degrees.

A rachet slider may be provided which cooperates with the rachet strap to enable the rachet slider to be moved along the rachet strap while blocking reverse movement thereof, wherein the rachet slider is provided with an indicator for indicating orientation of the toggle fastener in use.

According to another aspect of the present invention there is provided a method comprising the steps of: providing a toggle fastener comprising an arm extending along a first axis and defining a threaded opening along a direction perpendicular to the first axis the toggle fastener further comprising a rachet strap extending along a second axis and pivotally coupled to the arm adjacent a proximal end of the rachet strap, the arm and strap configured to pivot between first and second angles relative to each other; pivoting the rachet strap relative to the arm and urging a leading end of the arm through a hole in a mounting surface, whereby the strap is pivoted relative to the arm in the first direction until the angle between the first and second axes reduces to the second angle and the arm and rachet strap cooperate to block alignment thereof requiring the rachet strap to be flexed towards the arm to permit the leading end of the arm to be moved through the hole in the mounting surface; the rachet strap returning to its unflexed configuration upon the arm having been moved through the hole in the mounting surface, whereby the arm is caused to pivot in the opposite direction relative to the rachet strap until the angle between the first and second axes reduces to the first angle and the arm and rachet strap cooperate to block further rotation, wherein the first angle is bigger in magnitude than the second angle; moving a fixing feature along the rachet strap into engagement with the mounting surface while pulling the rachet strap in a direction away from the mounting surface, wherein the fixing feature cooperates with the rachet strap to resist reverse movement of the fixing feature along the rachet strap; and breaking excess rachet strap length extending from the fixing feature in a direction away from the mounting surface, wherein a user is able to subsequently mount a threaded fastener to the threaded opening of the arm.

The first angle may be between 60 to 90 degrees, optionally 65 degrees.

The second angle may be between 7 degrees to 20 degrees, optionally 18 degrees.

BRIEF DESCRIPTION OF THE DRAWINGS

Various aspects and embodiments of the invention will now be described by way of non-limiting example with reference to the accompanying drawings, in which.

DETAILED DESCRIPTION OF THE PREFERRED EMBODIMENT

Figure 1:
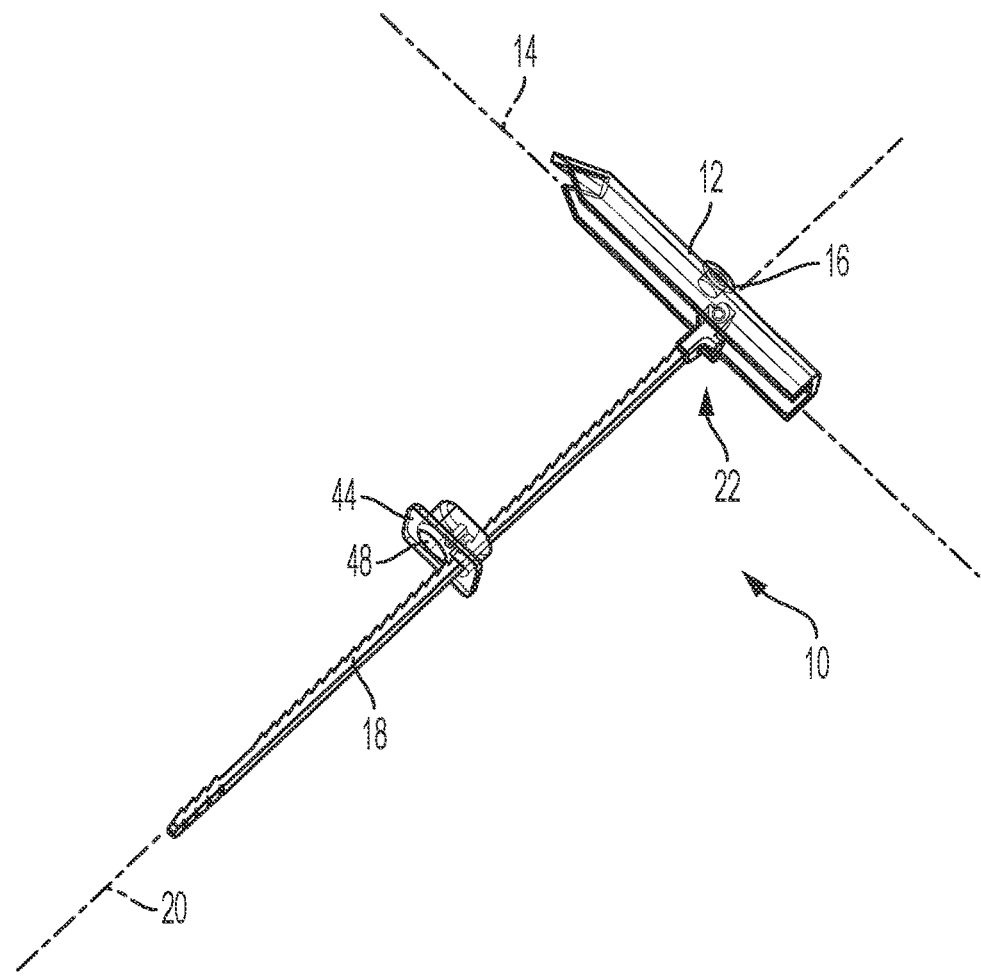
FIG. 1 illustrates a perspective view of a toggle fastener.

FIG. 1 illustrates a toggle fastener 10. The toggle fastener 10 has an arm 12 extending along a first axis 14. The arm 12 defines a threaded opening 16 through the arm 12 along a direction perpendicular to the first axis 14. The toggle fastener 10 further has a rachet strap 18 extending along a second axis 20 and pivotally coupled to the arm 12 adjacent a proximal end 22 of the rachet strap 18.

Figure 2:
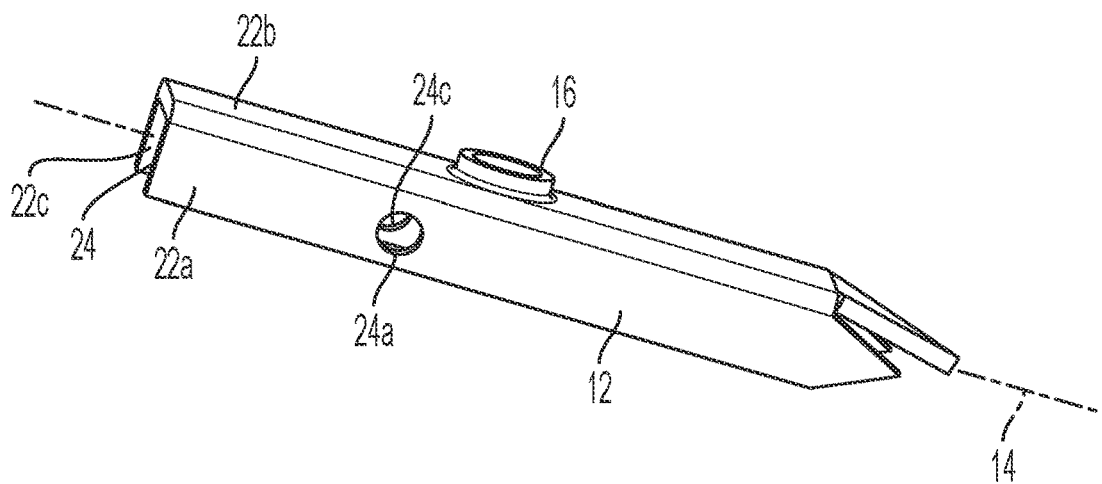
FIG. 2 illustrates an arm of the toggle fastener in FIG. 1.

FIG. 2 illustrates the arm 12 in isolation which has first, second and third walls 22a, 22b, 22c defining a channel 24, wherein the channel 24 extends along the first axis 14. The first and third walls 22a, 22c face each other and are located on opposite sides of the channel 24, whereas the second wall 22b connects the first and second walls 22a, 22c. The threaded opening 16 extends through the second wall 22b. Each of the first and third walls 22a, 22c define an opening 24a, 24c which are located opposite each other. In other words, by looking through the opening 24a in FIG. 2 one will be able to see out of the other adjacent opening 24c.

Figure 3:
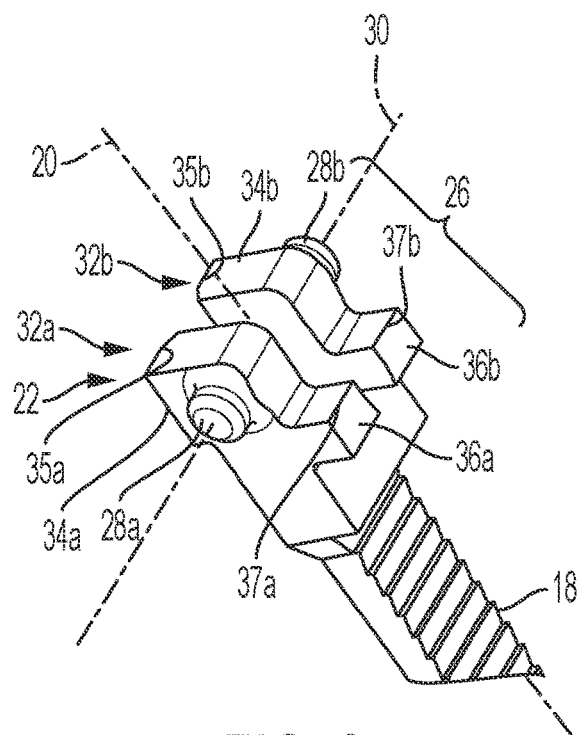
FIG. 3 illustrates a rachet strap of the toggle fastener in FIG. 1.

FIG. 3 illustrates the proximal end 22 of the rachet strap 18 which is provided with a head 26 integral to the rachet strap 18. One side of the head 26 defines a first protrusion 28a having a circular cross-section and the opposite side of the head 26 defines a second protrusion 28b having a circular cross-section. These protrusions are configured to be inserted into the aforementioned openings 24a, 24b of the head 12 in order to pivotally couple the head 12 to the rachet strap 18. A notional axis extending between the first and second protrusions 28a, 28b in FIG. 3 (and between the head openings 24a, 24b in use) is hereafter referred to as the pivot axis 30. The head 26 has two parts 32a, 32b. The first part 32a defines a first abutment 34a extending away from the pivot axis 30 on a first side of the head 26 and a second abutment 36a extending away from the pivot axis 30 on a second side of the head 26. The second part 32b has similar features, namely the first abutment 34b and the second abutment 36b.

Figure 4:
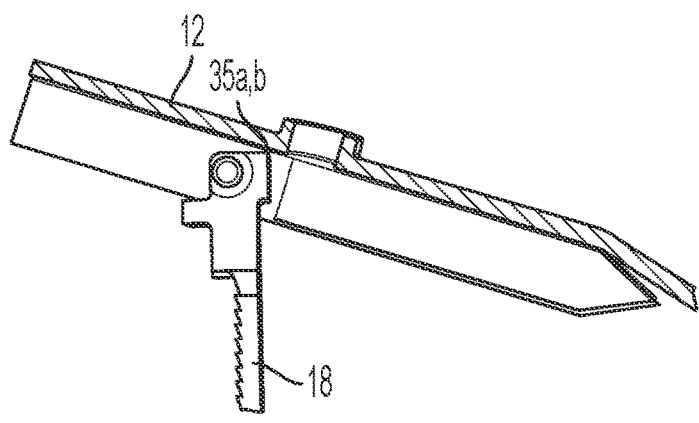
FIGS. 4 and 5 illustrate cross-sectional views of the toggle fastener in FIG. 1 at opposite extremes of pivotal movement between the arm and the rachet strap.
Figure 5:
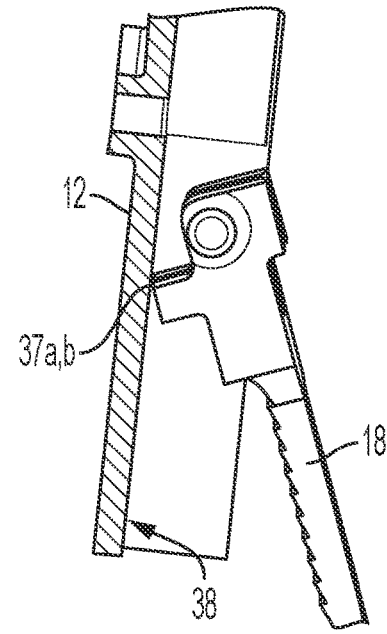

FIGS. 4 and 5 are cross-sectional views of the toggle fastener 10 showing the limits of pivotal movement between the arm 12 and the rachet strap 18. The second wall 22b of the arm 12 defines a planar inside surface 38. Upon pivoting the rachet strap 18 anti-clockwise about the pivot axis 30 in FIG. 4, eventually a first blocking edge 35a, 35b of the first abutments 34a, 34b will engage the planar inside surface 38. In this arrangement, as illustrated in FIG. 4, the toggle fastener 10 is in a first blocking configuration, wherein the angle between the first axis 14 and the second axis 20 is a first angle which can be preconfigured from 60 to 90 degrees, optionally 65 degrees. Upon pivoting the rachet strap 18 clockwise about the pivot axis 30 in FIG. 5, eventually a second blocking edge 37a, 37b of the second abutments 36a, 36b will engage the planar inside surface 38 of the arm 12. In this arrangement, in FIG. 5, the toggle fastener 10 is in a second blocking configuration, wherein the angle between the first axis 14 and the second axis 20 is a second angle which can be preconfigured from 7 degrees to 20 degrees, optionally 18 degrees.

Comparing FIGS. 4 and 5 the first blocking edges 35a,b are closer to the extreme proximal end 22 of the rachet strap 18 along the length of the rachet strap 18 than the second blocking edges 37a,b. In the embodiment described the first abutments 34a,b define the extreme proximal end 22 of the rachet strap 18 and so the first blocking edges 35a,b are located at the extreme distal end of the rachet strap 18. The first blocking edges 35a,b are located on an opposite side of the pivot point, defined by the pivot axis 30, to the second blocking edges 37a,b.

The toggle fastener 10 is configured such that upon pivoting the rachet strap 18 and arm 12 relative to each other into the first blocking configuration or the second blocking configuration (FIGS. 4, 5) further application of force to the rachet strap 18 at a point other than the head 26 will cause the strap portion 18 to recoverably flex.

Figure 6:
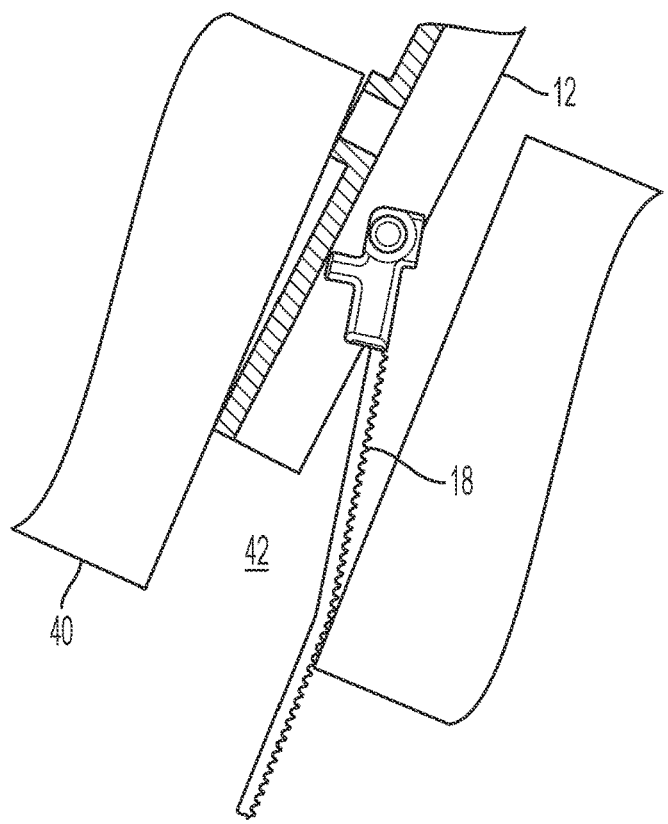
FIG. 6 illustrates a cross-sectional view of the toggle fastener in FIG. 1 being inserted into a hole in a mounting surface.

Why this is advantageous will now be described with reference to FIGS. 6 and 7. A mounting surface 40, for example gypsum or wood panel, defines a hole 42. To install the toggle fastener 10, the rachet strap 18 and arm 12 are pivoted into the second blocking configuration relative to each other and a leading end of the arm 12 is inserted into the hole 42. While gripping the rachet strap 18 a user pushes the arm 12 through the hole 42. As the toggle fastener 10 is fed into the hole 42 eventually the rachet strap 18 will engage an edge of the hole 42. Since further pivoting of the rachet strap 18 relative to the arm 12 is prevented (due to the toggle fastener 10 being in the first blocking configuration) in order to insert the toggle fastener 10 further into the hole 42 the rachet strap 18 must recoverably flex, thereby imparting elastic potential energy into the rachet strap 18. Looking at FIG. 6 upon pushing the toggle fastener 10 further into the hole 42 the rachet strap 18 will be pressed against one side of the hole 42, whereas the arm 12 will be pressed against the other side of the hole. A user gripping the rachet strap 18 keeps pushing the toggle fastener 10 through the hole 42 until the arm 12 clears the hole, namely until the trailing end of the arm 12 clears the hole 42.

Figure 7:
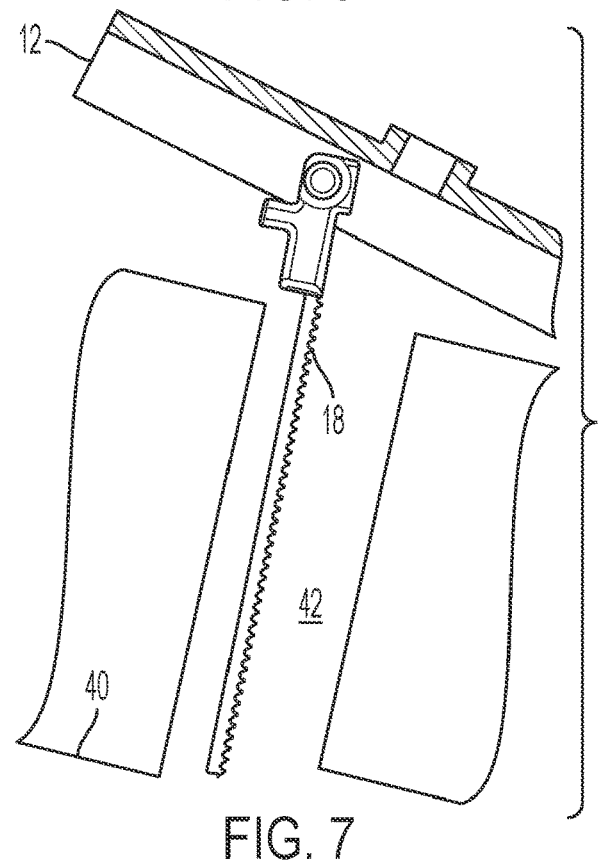
FIG. 7 illustrates a cross-sectional view of the toggle fastener in FIG. 6 after it has been inserted into the hole.

At this instant the elastic potential energy within the rachet strap 18 is released, whereby the rachet strap 18 returns to its unflexed configuration which causes the arm 12 to be flicked and thereby rotated relative to the rachet strap 18 into the first blocking configuration as illustrated in FIG. 7. The first blocking edges 35a,b prevent the arm 12 from rotating to an extent that it aligns with the hole 42. If the arm 12 could flick such that it aligns with the rachet strap 18 then the strap toggle 10 could be withdrawn from the hole 42, however, the first blocking edges 35a, 35b prevent this and block rotation of the arm 12 so it extends across the hole 42.

The toggle fastener 10 described herein enables fast and efficient installation, namely upon pushing the toggle fastener 10 into a hole 42 as described the toggle fastener 10 automatically sets itself in a locking configuration whereby the arm 12 extends across the hole 42 on the inside of the mounting surface 40. Overall efficiency is improved relative to the background prior art because a user does not need to remember the orientation of the arm 12 when it is out of view, moreover installation by virtue of an automatic spring operation is quicker and easier than having to turn a fastener upside down and cause the crossbar to pivot under gravity.

Figure 8:
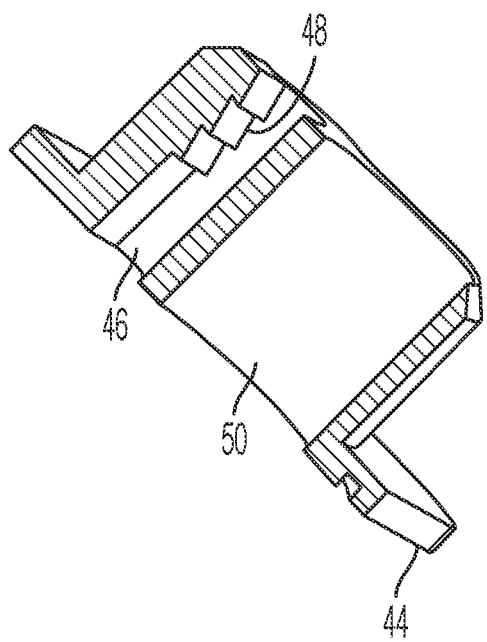
FIG. 8 illustrates a cross-sectional view of a washer of the toggle fastener in FIG. 1.

After the arm 12 extends across the hole 42 like in FIG. 7 the user pulls the rachet strap 18 in a direction out of the hole, whereby the arm 12 is pulled against the inner side of the mounting surface 40. A washer 44 is then moved along the rachet strap 18 into contact with the mounting surface 40. In particular the rachet strap 18 extends through a rachet opening 46 of the washer 44, see FIG. 8, which defines rachet teeth 48 for cooperating with teeth of the rachet strap 18 to resist reverse movement of the washer 44 along the rachet strap 18.

When the mounting surface 40 is sandwiched between the arm 12 and the washer 44 excess length of rachet strap 18 extending from the washer 44 away from the mounting surface 40 is broken away (the excess length is snapped or cut off).

A threaded fastener can then be fixed relative to the mounting surface 40 by causing it to extend through an opening 50 in the washer 44, through the hole 42 in the mounting surface 40, into threaded engagement with the threaded opening 16 of the arm 12. A fixture can thus be fixed to the mounting surface 40 using a threaded fastener.

In the foregoing embodiment the arm 12 and rachet strap 18 have been described as having specific shapes for restricting rotational freedom of such components relative to each other, namely the planer inside surface 38 of the arm 12 and the head 26 of the rachet strap illustrated in FIG. 3. However, this specific configuration is not essential for realising the advantages of the invention descried herein. The gap illustrated in FIG. 3 between the first and second parts 32a, 32b may be filled in whereby the head 26 exhibits a single part 32a (although of course such an embodiment would use more material, for example plastic, than the version in FIG. 3).

Moreover persons skilled in the art will appreciate from the foregoing that other specific configurations and shapes of the arm 12 and head 26 of the rachet strap 18 are possible, provided that the arm 12 and rachet strap 18 cooperate to restrict rotational movement beyond a first blocking configuration when pivoted relative to each other in a first rotational direction and that they cooperate to restrict rotational movement beyond a second blocking configuration when pivoted relative to each other in a second, opposite, rotational direction; the angle between the first and second axes 14, 20 in the second blocking configuration being smaller than in the first blocking configuration. In general it can therefore be said that the one side of each of the arm 12 and the rachet strap 18 define respective parts of a two-part engagement mechanism for blocking rotational movement of the arm 12 and the rachet strap 18 towards each other beyond the first angle, whereas the other side of each of the arm 12 and the rachet strap 18 define respective parts of another two-part engagement mechanism for blocking rotational movement of the arm 12 and the rachet strap 18 towards each other beyond the second angle.

Both the arm 12 and the rachet strap 18 may be formed of plastic. Alternatively, the arm 12 may be formed of metal while the rachet strap 18 is formed of plastic. The nature of the invention described herein is such that during manufacturing arms 12 can be made with different properties depending on their respective intended uses, such as depending on what specific type of threaded fastener they are to be used with (e.g. different arms 12 having different diameters of threaded openings 16 can be made), whereas a single batch of rachet straps 18 can be made, all having the same properties and specifications, and fitted to the different respective arms 12.

The arm 12 illustrated in the drawings has a spiked leading end, although this is not essential and can be omitted.

The washer 44 can be provided with an indicator for enabling a user to determine the position of the toggle fastener 10 in use. For example, the toggle fastener 10 in FIG. 1 can carry have an arrow shaped indicator, which extends substantially along the same direction as the arm 12 when it is perpendicular to the rachet strap 18 as indicated. Based on this indicator, in use when the arm 12 is obscured from view by a mounting surface, a user will be able to determine the orientation of the toggle fastener 10. The indicator may be integrally formed with the washer 44 and could comprise a depression or a protruding section of the washer 44.

It will be appreciated that whilst various aspects and embodiments have heretofore been described, the scope of the present invention is not limited thereto and instead extends to encompass all arrangements, and modifications and alterations thereto, which fall within the spirit and scope of the appended claims.

What is claimed is:

1. A toggle fastener comprising an arm extending along a first axis and defining a threaded opening through the arm along a direction perpendicular to the first axis the toggle fastener further comprising a rachet strap extending along a second axis and pivotally coupled to the arm adjacent a proximal end of the rachet strap the arm and the rachet strap being configured to cooperate for blocking the arm and the rachet strap from aligning upon being rotated relative to each other, wherein upon pivoting the arm and the rachet strap relative to each other about a first direction the angle between the first and second axes can be reduced to a first angle before further pivoting is blocked in a first blocking configuration of the toggle fastener, whereby attempting to pivot the rachet strap further in the first direction relative to the arm causes the rachet strap to recoverably flex, whereas upon pivoting the arm and the rachet strap relative to each other about a second, opposite, direction the angle between the first and second axes can be reduced to a second, smaller, angle before further pivoting is blocked in a second blocking configuration of the toggle fastener, whereby attempting to pivot the rachet strap further in the second direction relative to the arm causes the rachet strap to recoverably flex, the arm and the rachet strap not being formed integrally to each other.

2. The toggle fastener of claim 1, wherein in the first blocking configuration a first abutment portion of the rachet strap on a first side of the rachet strap engages a planar surface of the arm whereas in the second blocking configuration a second abutment portion of the rachet strap on a second side of the rachet strap engages the planar surface of the arm, the first abutment portion being located closer to the proximal end along the length of the rachet strap than the second abutment portion.

3. The toggle fastener of claim 1, wherein in the first blocking configuration a first abutment portion of the rachet strap on a first side of the rachet strap engages a planar surface of the arm whereas in the second blocking configuration a second abutment portion of the rachet strap on a second side of the rachet strap engages the planar surface of the arm, the first and second abutment portions being located on opposite sides of the pivot point along the length of the rachet strap.

4. The toggle fastener of claim 2, wherein the first abutment portion is defined by a first edge on a first side of the rachet strap and the second abutment portion is defined by a second edge on a second side of the rachet strap.

5. The toggle fastener of claim 2, wherein the first abutment portion comprises two sections respectively on opposing fingers of the rachet strap and the second abutment portion also comprises two sections respectively on said fingers.

6. The toggle fastener of claim 1, wherein the first angle is between 60 to 90 degrees.

7. The toggle fastener of claim 1, wherein the second angle is between 7 degrees to 20 degrees.

8. The toggle fastener of claim 1, further comprising a rachet slider which cooperates with the rachet strap to enable the rachet slider to be moved along the rachet strap while blocking reverse movement thereof, wherein the rachet slider is provided with an indicator for indicating orientation of the toggle fastener in use.

9. A method comprising the steps of:
  providing a toggle fastener comprising an arm extending along a first axis and defining a threaded opening along a direction perpendicular to the first axis the toggle fastener further comprising a rachet strap extending along a second axis and pivotally coupled to the arm adjacent a proximal end of the rachet strap, the arm and strap configured to pivot between first and second angles relative to each other;
  pivoting the rachet strap relative to the arm and urging a leading end of the arm through a hole in a mounting surface, whereby the strap is pivoted relative to the arm in the first direction until the angle between the first and second axes reduces to the second angle and the arm and rachet strap cooperate to block alignment thereof requiring the rachet strap to be flexed towards the arm to permit the leading end of the arm to be moved through the hole in the mounting surface;
  the rachet strap returning to its unflexed configuration upon the arm having been moved through the hole in the mounting surface, whereby the arm is caused to pivot in the opposite direction relative to the rachet strap until the angle between the first and second axes reduces to the first angle and the arm and rachet strap cooperate to block further rotation, wherein the first angle is bigger in magnitude than the second angle;
  moving a fixing feature along the rachet strap into engagement with the mounting surface while pulling the rachet strap in a direction away from the mounting surface, wherein the fixing feature cooperates with the rachet strap to resist reverse movement of the fixing feature along the rachet strap; and
  breaking excess rachet strap length extending from the fixing feature in a direction away from the mounting surface, wherein a user is able to subsequently mount a threaded fastener to the threaded opening of the arm.

10. The method of claim 9, wherein the first angle is between 60 to 90 degrees.

11. The method of claim 9, wherein the second angle is between 7 degrees to 20 degrees.

\* \* \* \* \*